United States Patent [19]

Bergstrand

[11] 4,123,945
[45] Nov. 7, 1978

[54] PRESSURE INDICATOR

[76] Inventor: Gunnar M. Bergstrand, 40 Stangholmsbacken 56, S-127 40 Skärholmen, Sweden

[21] Appl. No.: 805,482

[22] Filed: Jun. 10, 1977

[51] Int. Cl.² .............................................. G01L 9/10
[52] U.S. Cl. ................................................. 73/722
[58] Field of Search ............... 73/398 R, 407 R, 722, 73/728; 336/30

[56] References Cited

U.S. PATENT DOCUMENTS

| 3,638,497 | 2/1972 | Frenkel | 73/398 R |
| 3,946,615 | 3/1976 | Hluchan | 73/398 R |

FOREIGN PATENT DOCUMENTS

| 823,323 | 11/1959 | United Kingdom | 73/398 R |
| 982,930 | 2/1965 | United Kingdom | 73/398 R |

Primary Examiner—Donald O. Woodiel
Attorney, Agent, or Firm—Pollock, Vande Sande & Priddy

[57] ABSTRACT

A pressure indicator of the kind comprising a diaphragm box containing two chambers which are completely separated by a resilient diaphragm, each of the chambers communicating via a connecting channel with an associated one of two fluid sources between which a pressure difference is to be established. A metal plate is fastened to the diaphragm, and an inductive sensor is disposed at one of the walls of the diaphragm box, so that a pressure change in at least one of the chambers causes a change in distance between the metal plate and the sensor and, consequently, an output signal from the sensor. According to the invention, overloading of the diaphragm can be prevented in that the bottom wall of at least one of the chambers is located and shaped so as to support the diaphragm in case of a large pressure difference between the two chambers, the opening of the connecting channel into said one of the chambers being located in alignment with said metal plate, whereby the latter will cover said opening upon overloading the diaphragm.

5 Claims, 2 Drawing Figures

PRESSURE INDICATOR

BACKGROUND OF THE INVENTION

The invention relates to a pressure indicator of the kind comprising a diaphragm box containing two chambers which are completely separated by a resilient diaphragm, each of said chambers communicating via a connecting channel with an associated one of two fluid sources between which a pressure difference is to be established, wherein a metal plate is fastened to the diaphragm, and an inductive sensor is disposed at one of the walls of the diaphragm box, so that a pressure change in at least one of the chambers causes a change in distance between the metal plate and the sensor and, consequently, an output signal from the sensor.

In electronics, the use of so-called inductive sensors is known. Such a sensor consists essentially of a transistor-oscillator which upon connection to a current source produces a high-frequency electro-magnetic stray field. If a metal object is placed in the magnetic field, eddy currents will flow in the metal material and cause a change in the internal electrical resistance of the sensor. Thus, when the metal object has been advanced to a predetermined distance from the sensor the current in an external signalling circuit will be abruptly reduced, and this sudden change is used as an output signal. Inductive sensors of this kind are used primarily as pulse generators in electronic control devices, but sometimes also for sensing the presence of a metal object.

A pressure indicator of the kind defined in the opening paragraph and provided with an inductive sensor as described above is disclosed in Swedish Pat. No. 7201662-9. Such a pressure indicator has many advantages. Since the diaphragm is not mechanically connected to a bar or the like passing through the wall of the box, there is neither any friction between the movable and stationary parts nor any difference in effective area between the two sides of the diaphragm. The device will therefore be totally balanced and, when indicating small as well as large pressure differences, it operates with great sensitivity and accuracy. Even when both of the pressures to be compared are high, very small differences in pressure can be indicated. Moreover, it is possible to adjust the sensitivity of the device within wide limits by changing the distance between the metal plate and the sensor. Thus, if the metal plate has been originally adjusted so that even a small displacement towards or from the sensor results in an output signal, the sensitivity is great and enables the indication of very small differences in pressure, e.g., 0,1 mm water column. On the other hand, if the device is to react only to larger pressure differences, such a performance can be obtained by increasing or reducing the distance between the metal plate and the sensor, so that the metal plate, in case of a pressure difference between the chambers, must to be displaced a longer distance before it passes the point where the output signal is obtained. Whether the distance between the plate and the sensor should be increased or decreased in such an adjustment process depends, of course, on the side of the diaphragm where the higher pressure is to be expected.

However, a disadvantage of this known pressure indicator is that the diaphragm may easily break in case of a large, possibly unintentional, pressure difference between the two chambers.

SUMMARY OF THE INVENTION

According to the invention, it has turned out that overloading of the diaphragm can be prevented in that the bottom surface of at least one of the chambers is located and shaped so as to support the diaphragm upon deflection thereof due to a large pressure difference between the two chambers, the opening of the connecting channel into said one of the chambers being located in alignment with said metal plate, the latter being dimensioned so as to cover said opening upon deflection of the diaphragm against the supporting bottom wall of the chamber.

Preferably, the diaphragm is fastened to the diaphragm box only along its edge portions. The diaphragm is typically circular, and at least one of the chambers is generally cylindrical with a minor height, i.e., the distance between the chamber bottom surface and the diaphragm is small. The metal plate and the channel opening are preferably located centrally in the cylindrical chamber.

Moreover, in the preferred embodiment, one end of the sensor is sealingly inserted through one of the walls of the diaphragm box in alignment with the metal plate, said one end of the sensor defining a bottom wall portion of the other one of the two chambers.

BRIEF DESCRIPTION OF THE DRAWINGS

The invention is explained more fully below with reference to the drawings.

DESCRIPTION OF A PREFERRED EMBODIMENT

Figure 1:
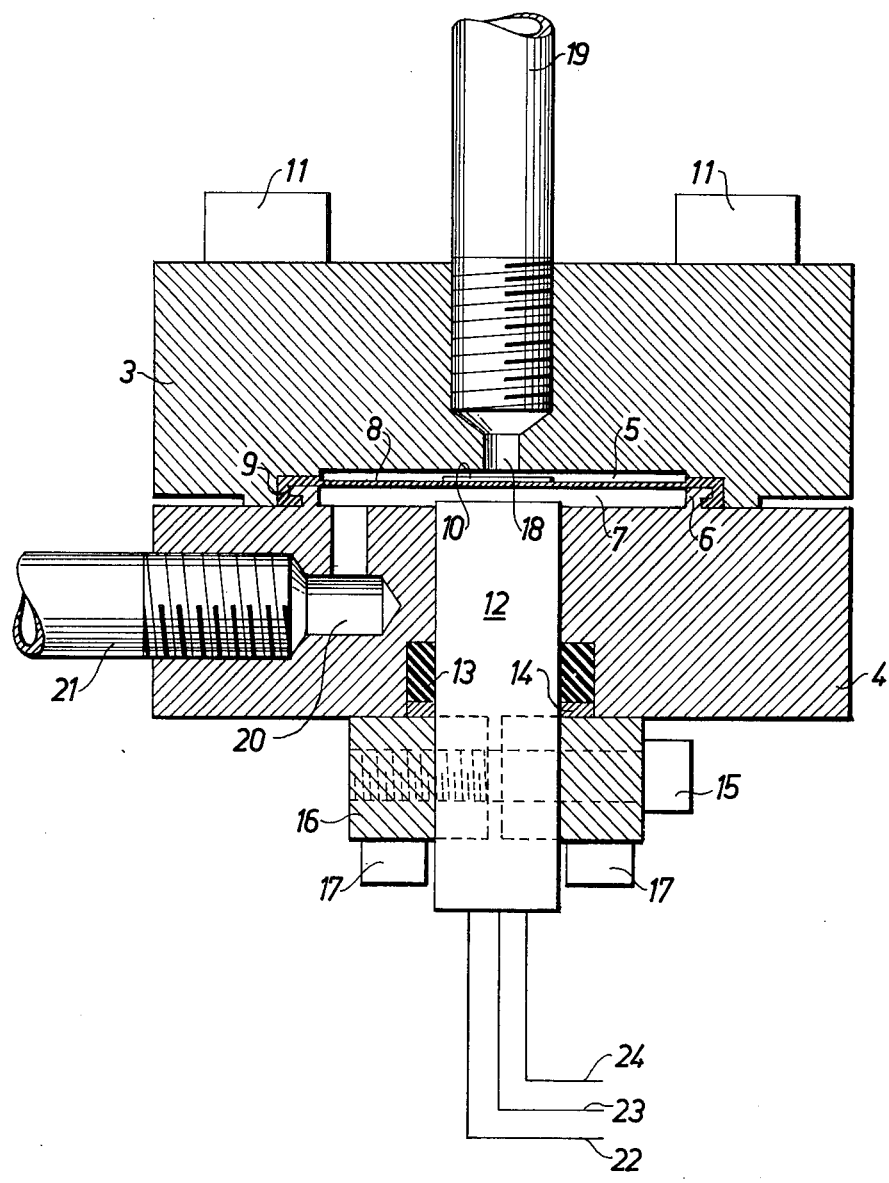
FIG. 1 shows an embodiment in a central section perpendicular to the diaphragm.
Figure 2:
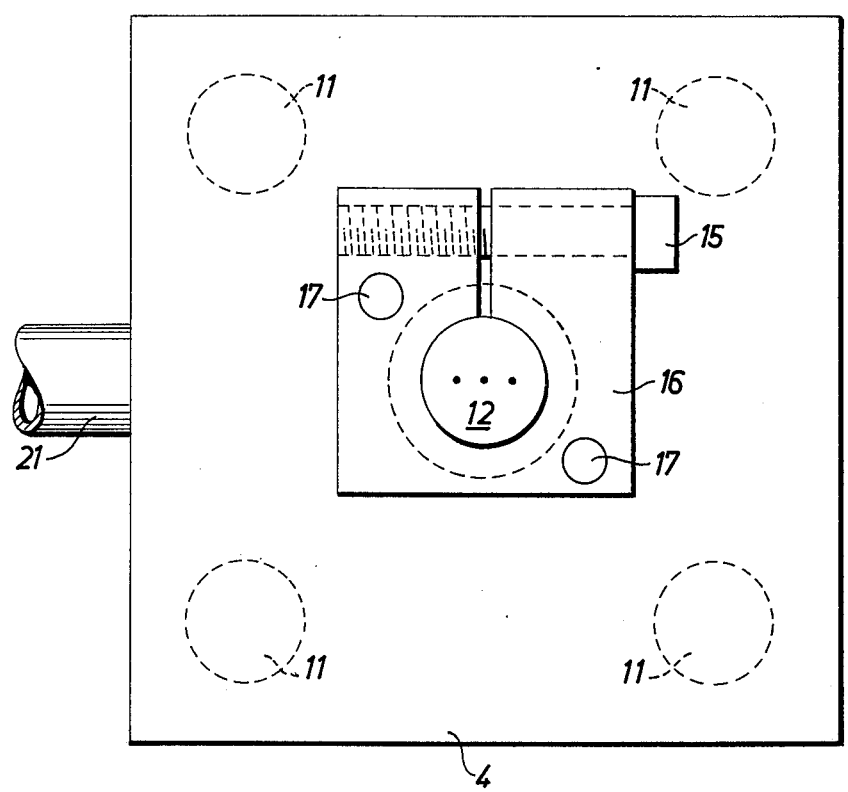
FIG. 2 shows the device of FIG. 1 seen from below.

The diaphragm box is composed of two blocks 3 and 4, the opposite sides of which are formed to define a central, cylindrical cavity. Thus, the underside of the upper block 3 is provided with a relatively shallow recess 5 forming an upper diaphragm chamber, and the top of the lower block 4 has an upstanding annular flange 6, which is bent radially outwards so as to define an interior space forming a lower diaphragm chamber 7, the diameter of which is equal to that of the upper chamber 5. A circular, thin and resilient diaphragm 8, e.g., of rubber, is provided with a somewhat thicker edge portion 9, which forms a rather rigid, U-shaped flange gripping the flange 6 in order to keep the diaphragm in place. Preferably, the dimensions are such that the diaphragm is slightly stretched when being mounted so as to obtain a certain permanent pre-stress. A circular metal plate 10 is fastened, preferably already before the assembly, e.g., by means of an adhesive or by vulcanization, centrally to one side of the diaphragm; in the embodiment shown, at the upper side thereof. Upon mounting of the diaphragm, the two blocks 3,4 are fastened to each other by means of screw bolts 11 which are screwed into threaded holes inside the four corners of the blocks.

The lower block 4 has a hole extending axially through the same in line with the metal plate, for inserting a cylindrical inductive sensor 12 of the kind discussed above. Adjacent its outer end, the hole is surrounded by an annular recess for mounting a sealing ring 13 and a pressure ring 14. The sensor 12 is adjusted in such a way that its inner end is located at a desired distance from the diaphragm 8 and the metal plate 10, and secured in this position by means of a clamping collar 16, provided with a tightening screw 15, the collar 16 being fastened to the underside of the block 4 by screws 17. The pressure ring 14 is pushed from an outwardly protruding position inwardly against the sealing ring 13, which is thereby slightly compressed, so that it seals effectively against the cylindrical surface of the sensor 12.

The upper block 3 has a channel 18 extending through the same and leading into the diaphragm chamber 5, the channel 18 being oriented axially in line with the metal plate 10 and having a wider outer threaded portion for connection of a threaded end of tubular conduit 19. A channel 20, which extends sideways from the lower diaphragm chamber 7 via a perpendicularly deflected portion, has likewise a threaded wider outer portion for connection of a conduit 21. The two conduits 19 and 21 normally communicate with two fluid sources, between which the pressure difference is to be established. It is, of course, also possible to establish a difference in negative (vacuum) pressure between two sources and, alternatively, only one of the channels 18 and 20 may be connected to a pressurized or vacuum source, while the other channel may communicate with the ambient air.

Two electrical conduits 22,23 are connected to the inductive sensor 12 for connection to an electrical supply. Moreover, there is a conduit 24 intended for an output signal from an amplifier contained in the sensor 12. The output signal conduit can be connected to a relay (not shown) for actuating an indicator, such as a lamp or a buzzer, upon receipt of a current pulse.

In the preferred embodiment shown, it can be assumed that the distance between the sensor 12 and the metal plate 10 is adjusted so that only a small increase of the distance is necessary for obtaining a distinct output signal. Thus, the lower diaphragm chamber 7 shall in this case be exposed to a higher pressure from the tubular conduit 21 in order to deflect the diaphragm upwardly. Upon a large pressure difference between the two diaphragm chambers 5,7, the diaphragm will be deflected into contact with the bottom wall of the chamber 5. In this case, the mouth of the channel 18 will be totally covered by the metal plate 10, and the thin diaphragm is supported at all portions thereof. Thus, there is no risk of breaking the diaphragm in case of a heavy load.

As a practical example, it can be mentioned that the electrical current in the output signal conduit is typically about 1 mA up to a distance of about 2 mm between the sensor and the metal plate, whereas, upon an increase of this distance by about 0.1 mm, the current amperage will rise abrubtly about ten fold.

Naturally, it is also possible to adjust the distance between the sensor and the metal plate in such a way that the output signal is at a high level, as long as the pressures in the chambers 5,7 are substantially equal, whereas the current will be abrubtly reduced upon exposure of the upper diaphragm chamber 5 to a higher pressure. However, the first-mentioned alternative seems to be the most practical one in normal cases.

I claim:

1. A pressure indicator of the type comprising a diaphragm box containing two chambers which are completely separated by a thin, non-metallic resilient diaphragm, each of said chambers communicating via a connecting channel with an associated one of two fluid sources between which a pressure differential is to be established, a metal plate being fastened to the diaphragm, and an inductive sensor being disposed at one of the walls of the diaphragm box, so that a pressure change in at least one of the chambers causes a change in distance between the metal plate and the sensor and, consequently, an output signal from the sensor, wherein
   (a) the bottom wall of at least one of the chambers is located and shaped so as to support the diaphragm upon deflection at substantially all portions thereof due to a large pressure differential between the two chambers, and
   (b) the opening of the connecting channel into said one of the chambers is located in alignment with said metal plate, the latter being dimensioned so as to cover said opening upon deflection of the diaphragm against the supporting bottom wall of the chamber.

2. A pressure indicator as set forth in claim 1, wherein the diaphragm is fastened to the diaphragm box only along its edge portions.

3. A pressure indicator as set forth in claim 1, wherein the diaphragm is circular, and at least one of the chambers is generally cylindrical with a minor height.

4. A pressure indicator as set forth in claim 3, wherein the metal plate and said opening are located centrally in the cylindrical chamber.

5. A pressure indicator as set forth in claim 1, wherein one end of the sensor is sealingly inserted through one of the walls of the diaphragm box in alignment with the metal plate, said one end of the sensor defining a bottom wall portion of the other one of the two chambers.

* * * * *